United States Patent
Reid (10) Patent No.: US 11,090,607 B2
(45) Date of Patent: Aug. 17, 2021

(54) METHOD AND APPARATUS FOR REMOVING CARBON DIOXIDE FROM FLUE GAS

(71) Applicant: SQUARETAIL PTY LTD, Western Australia (AU)

(72) Inventor: Terrence Reid, Western Australia (AU)

(73) Assignee: Squaretail Pty Ltd, Western Australia (AU)

( * ) Notice: Subject to any disclaimer, the term of this patent is extended or adjusted under 35 U.S.C. 154(b) by 586 days.

(21) Appl. No.: 16/071,350

(22) PCT Filed: Jan. 20, 2017

(86) PCT No.: PCT/AU2017/050043
§ 371 (c)(1),
(2) Date: Jul. 19, 2018

(87) PCT Pub. No.: WO2017/124151
PCT Pub. Date: Jul. 27, 2017

(65) Prior Publication Data
US 2021/0138398 A1 May 13, 2021

(30) Foreign Application Priority Data
Jan. 21, 2016 (AU) ................ 2016900186

(51) Int. Cl.
*B01D 53/62* (2006.01)
*B01D 53/78* (2006.01)
*B01F 3/04* (2006.01)

(52) U.S. Cl.
CPC ......... *B01D 53/62* (2013.01); *B01D 53/78* (2013.01); *B01F 3/04609* (2013.01);
(Continued)

(58) Field of Classification Search
CPC ........ B01D 53/22; B01D 2053/221; B01D 2053/223; B01D 53/62; B01D 53/78;
(Continued)

(56) References Cited

U.S. PATENT DOCUMENTS

| 5,958,353 | A | 9/1999 | Eyal |
| 2010/0258506 | A1 | 10/2010 | Berkowitz et al. |
| 2011/0171105 | A1* | 7/2011 | Sevier .......... B01D 53/62 423/420 |

FOREIGN PATENT DOCUMENTS

| CN | 101180241 A | 5/2008 |
| CN | 102718246 A | 10/2012 |

(Continued)

OTHER PUBLICATIONS

Extended European Search Report issued for European Patent Application No. 17740914.1, dated Jun. 20, 2019, 9 pages.
(Continued)

*Primary Examiner* — Timothy C Vanoy
(74) *Attorney, Agent, or Firm* — Haynes and Boone, LLP (57) ABSTRACT

A method of removing carbon dioxide from flue gas is disclosed. The method comprises mixing the flue gas with ammonia; and contacting the gas mixture with calcium nitrate solution to produce calcium carbonate precipitates and ammonium nitrate solution; or contacting the gas mixture with sodium nitrate solution to produce sodium carbonate precipitates and ammonium nitrate solution. The carbonate/bicarbonate precipitates are recovered by separating the carbonate/bicarbonates (s) from said solutions. An apparatus for performing the above method is also disclosed. The apparatus comprises a reaction vessel with an inlet to receive said solution and an inlet to receive and deliver a flue gas-ammonia mixture to a gas-liquid contactor which is configured to diffuse said gas mixture into either calcium nitrate or sodium nitrate solution. The reaction vessel is also (Continued)

provided with an impellor and draft tube configured to circulate the diffused gas mixture throughout the calcium nitrate or sodium nitrate solution for a period of time sufficient to produce carbonate/bicarbonate precipitates locking the CO2 into a solid form.

17 Claims, 5 Drawing Sheets

(52) U.S. Cl.
CPC .............. *B01D 2251/2062* (2013.01); *B01D 2251/304* (2013.01); *B01D 2251/608* (2013.01); *B01D 2258/0283* (2013.01); *B01F 2003/0468* (2013.01); *B01F 2003/04631* (2013.01)

(58) Field of Classification Search
CPC ........ B01D 2251/304; B01D 2251/404; B01D 2251/608; B01D 2251/60; B01D 2257/504; B01D 2258/0283; B01J 10/002; B01J 19/2435; B01J 19/2455; B01J 19/246; B01J 2219/00493
See application file for complete search history.

(56) References Cited

FOREIGN PATENT DOCUMENTS

| | | | |
|---|---|---|---|
| CN | 103861446 A | | 6/2014 |
| DE | 1442685 A1 | | 11/1969 |
| JP | 2006-320817 A | | 11/2006 |
| JP | 2008-132483 A | | 6/2008 |
| JP | 2010-502420 A | | 1/2010 |
| RU | 2232717 C2 | | 7/2004 |
| RU | 2449828 C2 | | 5/2012 |
| WO | WO 1994012266 A1 | | 6/1994 |
| WO | WO 2008/026201 A2 | | 3/2008 |
| WO | WO2010/032049 A1 | | 3/2010 |
| WO | WO 2015/051400 A1 | | 4/2015 |
| WO | WO2015/051400 A1 | | 4/2015 |
| WO | WO 2015/085353 A1 | | 6/2015 |
| WO | WO 2015085353 A1 | | 6/2015 |

OTHER PUBLICATIONS

First Examination Report for Indian Patent Application No. 201847029924, prepared by Indian Intellectual Property Office, dated Aug. 29, 2020, (4 pgs.).
First Office Action for Chinese Patent Application No. 201780007809.9, prepared by China National Intellectual Property Administration, dated Oct. 29, 2020, 12 pages.
English Translation of First Office Action for Chinese Patent Application No. 201780007809.9, prepared by China National Intellectual Property Administration, dated Oct. 29, 2020, 16 pages.
Federal Service on Intellectual Property, Federal State Budgetary Enterprise "Federal Institute of Industrial Property" (FIPS), Notification of the Results of Examination on Patentability issued for Russian Federation Patent Application No. 2018130098, dated Mar. 2, 2020, 4 pages, English translation.
Federal Service on Intellectual Property, Federal State Budgetary Enterprise "Federal Institute of Industrial Property" (FIPS), Search Report issued for Russian Federation Patent Application No. 2018130098, dated Mar. 2, 2020, 2 pages, English translation.
International Search Report and Written Opinion for International Application No. PCT/AU2017/050043 dated Feb. 23, 2017. (12 pages).
Second International Written Opinion for International Application No. PCT/AU2017/050043 dated Dec. 11, 2017. (6 pages).
English Translation of Japanese Office Action for Japanese Patent Application No. 2018-5363730, prepared by Japanese Patent Office. dated Oct. 6, 2029. 5 pages.
Final Office Action for Japanese Patent Application No. 2018-538730, prepared by Japanese Patent Office, dated May 18, 2021, 3 pages.
English Translation of Final Office Action for Japanese Patent Application No. 2018-538730, prepared by Japanese Patent Office, dated May 18, 2021, 3 pages.
Preliminary Office Action for Brazilian Patent Application No. BR112018014966-7, prepared by Brazilian Patent Office, dated May 11, 2021, 4 pages.
English Translation of Preliminary Office Action for Brazilian Patent Application No. BR112018014966-7, prepared by Brazilian Patent Office, dated May 11, 2021, 2 pages.
Second Office Action for Chinese Patent Application No. 201780007809.9, prepared by China National Intellectual Property Administration, dated Jun. 9, 2021, 10 pages.
English Translation of Second Office Action for Chinese Patent Application No. 201780007809.9, prepared by China National Intellectual Property Administration, dated Jun. 9, 2021, 16 pages.

* cited by examiner

METHOD AND APPARATUS FOR REMOVING CARBON DIOXIDE FROM FLUE GAS

FIELD

The present invention relates to a method and apparatus for removing carbon dioxide from flue gas. In particular the present invention relates to a method and apparatus for removing carbon dioxide from flue gas using either calcium nitrate solution, sodium nitrate solution or calcium sulphate solution.

BACKGROUND

Flue gas from power plants, industrial plants, refineries and so forth are a major source of greenhouse gases, in particular carbon dioxide. There are several chemical processes and scrubbers which are routinely used to treat flue gas to remove pollutants such as particulates, heavy metal compounds, nitrogen oxides and sulphur oxides to comply with regulations for environmental emissions control. However, there is an ongoing need for technologies directed to methods and systems for capture and storage of carbon dioxide that are economically viable. Additionally, it would be advantageous to convert the massive volume of carbon dioxide being discharged into the atmosphere needs into multiple by-products to avoid the market glut and disposal problems which might arise if only one product was produced.

One commercially proven process for the recovery of carbon dioxide from flue gas uses commercial absorbents comprising monoethanolamine (MEA) and other primary amines. These absorbents are capable of recovering 85-95% of the carbon dioxide in flue gas and produce a 99.95+% pure carbon dioxide product when regenerated. However, these absorbents require regular regeneration which has an energy cost associated therewith, and the absorbents are subject to corrosion and solvent degradation problems over time.

There is therefore a need for alternative or improved methods and systems to produce multiple products from a carbon capture process removing carbon dioxide from flue gas. If millions of tonnes of carbon dioxide are used to produce a single product it would soon be in oversupply. A process that produces multiple high value products from carbon capture has the ability to enrich many countries' economy.

In view of the large volumes of carbon dioxide which would be recovered from emission sources, there is also a need for an apparatus that occupies as small an environmental footprint as possible, in particular to be retrofitted to existing plants where large volumes of carbon dioxide are produced. There is a need to configure the apparatus with vertical cylindrical reactors having suitable diameters to fit the available space.

SUMMARY

According to a first aspect, there is provided a method of removing carbon dioxide from a flue gas, the method comprising:
mixing the flue gas with ammonia; and,
contacting the gas mixture from step a) with a solution containing calcium nitrate, sodium nitrate or calcium sulphate to produce carbonate and/or bicarbonate precipitates in an ammonium nitrate or ammonium sulphate solution.

In one embodiment, the method may further comprise the step of recovering the carbonate/bicarbonate precipitates by separating the carbonate/bicarbonate precipitates from the ammonium nitrate solution or the ammonium sulphate solution.

In another embodiment, slipped ammonia vapours from step b) may be collected, recirculated and mixed with the flue gas and ammonia in step a).

According to a second aspect, there is provided an apparatus for removing carbon dioxide from a flue gas, the apparatus comprising:
a vessel having an inlet to receive a solution containing calcium nitrate, sodium nitrate or calcium sulphate and an inlet to receive a gas mixture of flue gas and ammonia;
a gas-liquid contactor configured to diffuse said gas mixture into the calcium nitrate solution, the sodium nitrate solution or the calcium sulphate solution received in the vessel;
the vessel being provided with an impellor and draft tube configured to circulate the diffused gas mixture in the calcium nitrate, sodium nitrate or calcium sulphate solutions for a period of time sufficient to produce carbonate/bicarbonate precipitates.

BRIEF DESCRIPTION OF THE DRAWINGS

Notwithstanding any other forms which may fall within the scope of the method and apparatus as set forth in the Summary, specific embodiments will now be described, by way of example only, with reference to the accompanying drawings in which:

FIG. 3 is a schematic representation of a plant for removing carbon dioxide from flue gas using the apparatus for continuous batching method. FIG. 3 includes the emission cooling multi tubed air and water cooled manifolds.

DETAILED DESCRIPTION

In one aspect, the present application relates to a method of removing carbon dioxide from flue gas.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Flue Gas

The term 'flue gas' is used broadly to refer to any gas exiting to the atmosphere via a flue, which is a pipe line for conveying exhaust gases produced by industrial or combustion processes. Generally, flue gas refers to the combustion exhaust gas produced at power plants fuelled by fossil fuels, such as coal, oil and gas. However, it will be appreciated that the term flue gas may refer to exhaust gases containing carbon dioxide produced by other industrial processes such as cement and lime production, steel production, incinerators, and the process furnaces in large refineries, petrochemical and chemical plants; and also to exhaust gases from various types of engines including, but not limited to, diesel engines, combustion engines, and gas-turbine engines.

The composition of flue gas depends on the combustion fuel or the type of industrial process which generates the flue gas. Flue gas may comprise one or more gases selected from the group comprising nitrogen, carbon dioxide, carbon monoxide, water vapour, oxygen, hydrocarbons, and pollutants, such as particulate matter, nitrogen oxides ($NO_x$) and sulphur oxides ($SO_x$).

Removing Carbon Dioxide

The method of removing carbon dioxide from flue gas comprises:
mixing the flue gas with ammonia; and,
contacting the gas mixture from step a) with a solution containing calcium nitrate, sodium nitrate or calcium sulphate to produce carbonate and/or bicarbonate precipitates in an ammonium nitrate or ammonium sulphate solution.

Cooling the Flue Gas

The temperature of the flue gas exiting from a flue may be in the range of about 300° C. to about 800° C., depending on the process by which the flue gas is produced, the length of the flue, and other factors as will be understood by those skilled in the art. Prior to mixing the flue gas with ammonia, the flue gas may be cooled to less than 35° C.

Cooling the flue gas may be achieved by passing the flue gas through a heat exchanger. The heat exchanger may be an inline air-cooled or water cooled multi-tubed heat exchanger.

Additionally, or alternatively, cooling the flue gas may be achieved by mixing the flue gas with a lower temperature gas, in particular ammonia or slipped ammonia vapours which have been collected from the reaction of the gas mixture with the solution containing calcium nitrate, sodium nitrate or calcium sulphate in step b).

Mixing the Flue Gas with Ammonia

Mixing the flue gas with ammonia may comprise introducing a flow of ammonia into a flow of flue gas. In certain embodiments the flow of flue gas comprises a humidified flow of flue gas. The term 'humidified', 'humidifying' or variants thereof as used herein refers to a gas which is saturated with water vapour at pressure and temperature.

The flue gas-ammonia mixture may comprise from about 20% v/v to about 40% v/v ammonia.

The flue gas may be also compressed to a pressure of at least 5 psi, preferably to a pressure between 5 psi and about 15 psi.

The primary chemisorption process relating to adsorption of carbon dioxide in the cooled ammonia-flue gas mixture is described as:

$$CO_2+(NH_4)OH \rightarrow NH_4)HCO_3$$

or alternatively $$CO_2+NH_3+H_2O \rightarrow (NH_4)HCO_{3(aq)}$$

This primary chemisorption process may be assisted by humidifying the flue gas and/or the ammonia gas. The flue gas may inherently contain water vapour in the form of steam. Additionally, or alternatively, the ammonia gas may be humidified prior to mixing it with the flue gas. It will be appreciated that ammonia slip vapours collected and circulated from step b) are humidified.

Advantageously, the ammonia in the resulting flue gas-ammonia mixture will be absorbed and solubilised in either calcium nitrate solution, sodium nitrate solution or calcium sulphate solution when the flue gas-ammonia mixture is passed through the gas-liquid contactor as described below.

Calcium Nitrate Solution

The term 'calcium nitrate solution' broadly refers to any aqueous solution that contains a significant concentration of dissolved $Ca(NO_3)_2$. The concentration of dissolved salts is usually expressed in grams per litre. The concentration of the calcium nitrate in the calcium nitrate solution may be greater than about 230 grams of calcium nitrate per litre and up to 860 g/L calcium nitrate. The aqueous solution may be water, deionised water, ultrapure water, distilled water, municipal water, groundwater, produced water or process water that carries very little contaminants.

Sodium Nitrate Solution

The term 'sodium nitrate solution' broadly refers to any aqueous solution that contains a significant concentration of dissolved $NaNO_3$. The concentration of dissolved salts is usually expressed in grams per litre. The concentration of sodium nitrate in the sodium nitrate solution may be greater than about 230 grams of sodium nitrate per litre. The aqueous solution may be water, deionised water, ultrapure water, distilled water, municipal water, groundwater, produced water or processed water that carries very little contaminants Calcium Sulphate Solution The term 'calcium sulphate' broadly refers to any aqueous solution that contains a significant concentration of dissolved and undissolved $CaSO_4$. The concentration of the dissolved and undissolved salts are usually expressed in grams per litre. The concentration of the calcium sulphate may be greater than about 500 grams of calcium sulphate per litre. The aqueous solution may be water, deionised water, ultrapure, water, distilled water, municipal water, ground water, produced water or processed water that carries very little contaminants.

The pH of calcium nitrate, sodium nitrate or calcium sulphate solution may be in a range of about 7 to about 10, preferably in the range of about 7.5 to about 9.6. Suitable buffers, as will be well known to those skilled in the art, may be used to maintain the pH of the calcium nitrate, sodium nitrate or calcium sulphate solution in the desired pH range, although it is anticipated that in most cases the volume of ammonia in the flue gas-ammonia mixture will be sufficient to maintain the pH of the calcium nitrate, sodium nitrate or calcium sulphate solution in the desired pH range.

The calcium nitrate solution, the sodium nitrate solution or the calcium sulphate solution is maintained at a low temperature of less than 35° C., preferably from about 20° C. to about 33° C. The calcium nitrate solution, the sodium nitrate solution or the calcium sulphate solution is kept at low temperature to increase the capacity of said solution to absorb carbon dioxide from the flue gas-ammonia gas mixture and to maintain the carbon dioxide in solution as bicarbonate/carbonate anions, as will be described later. Maintaining said solution at low temperature assists in keeping the ammonia carbonate/bicarbonate in solution, thereby preventing build-up of pressure from slipped ammonia and $CO_2$ in the headspace above the reacting mixture.

Contacting the Gas Mixture with the Calcium Nitrate Solution, the Sodium Nitrate Solution or the Calcium Sulphate Solution

Contacting the gas mixture with the calcium nitrate solution, the sodium nitrate solution or the calcium sulphate solution may comprise passing the flue gas-ammonia mixture through a gas-liquid contactor. The gas-liquid contactor is configured to diffuse bubbles of said gas mixture into the aqueous solution.

It will be appreciated that contacting the flue gas-ammonia mixture with the calcium nitrate solution, the sodium nitrate solution or the calcium sulphate solutions facilitates absorption of carbon dioxide and ammonia (and $SO_x$ and $NO_x$ gases) in said solution. Absorption thereof may be by physical absorption or chemisorption processes.

In physical absorption processes, carbon dioxide and ammonia dissolve in said solution. The solubility of the dissolved carbon dioxide gas will be dependent, at least in part, on the temperature, pressure and pH of said solution.

The primary chemisorption process relating to absorption of carbon dioxide and ammonia in the calcium nitrate solution, the sodium nitrate solution or the calcium sulphate solution can be described as follows:

$$CO_{2(g)} + CaNO_3(aq) + NH_{3(g)} + H_2O \rightarrow CaCO_3(s) + NH_4^+ + NO_3^-(aq) \qquad 1.$$

$$CO_{2(g)} + NaNO_{3(aq)} + NH_{3(g)} + H_2O \rightarrow NaHCO_{3(s)} + NH_{4+} + NO_{3(aq)} \qquad 2.$$

$$CaSO_{4(s)} + NH_4HCO_{3(aq)} \rightarrow CaCO_{3(s)} + NH_4SO_{4(aq)} \qquad 3.$$

The gas-liquid contactor may be configured to produce a gas bubble having a mean size selected to ensure a desired degree of gas-liquid mass transfer to achieve adsorption of carbon dioxide and ammonia in the calcium nitrate, sodium nitrate or calcium sulphate aqueous solution and effective gas scrubbing.

Similarly, the pressure and the flow rate of the gas mixture through the gas-liquid contactor may be selected to produce a gas bubble having a size selected to ensure a desired degree of gas mass transfer to achieve adsorption of carbon dioxide and ammonia in the calcium nitrate, sodium nitrate or calcium sulphate solution and effective gas scrubbing.

The bubbles of flue gas-ammonia gas mixture are entrained in circulatory currents in the calcium nitrate solution, sodium nitrate solution or calcium sulphate solution established therein by a rotating mixing device in the form of an impellor. In this way, said bubbles are dispersed throughout the calcium nitrate solution, sodium nitrate solution or calcium sulphate solution.

The gas mixture may be continually, or intermittently, introduced into the calcium nitrate, sodium nitrate or calcium sulphate solutions until said solution reaches saturation with respect to carbon dioxide and carbonate or bicarbonate precipitates begin to form. It will be appreciated by persons skilled in the art that the carbonate precipitates will generally take the form of calcium carbonate in the calcium nitrate solution or calcium sulphate solution and sodium carbonate/bicarbonate form in the sodium nitrate solution, depending on the concentration thereof in the reaction mixture.

The reaction mixture may be allowed to age to increase the particle size of the carbonate precipitates and aid separation thereof. Ageing may take place in situ. Alternatively, the reaction mixture may be transferred to a separate vessel for ageing and/or settling of the calcium carbonate precipitates or sodium carbonate/bicarbonate precipitates. For batch processes, ageing may proceed over a two to four hour period.

Alternatively, in a continuous process, the reaction mixture and a laundered ammonia-flue gas stream may pass through a series of reaction vessels having reaction mixtures with increasing concentration of reagents and products. After passing through the reaction vessels the laundered ammonia-flue gas mixture passes out through a stack launder, a final laundering system that captures any slipped ammonia. The stack launder ensures clean emissions are released into the atmosphere. The term 'laundered' as used herein refers to a gas stream that has been humidified by passing the gas stream through an aqueous solution.

Recovering the Carbonate/Bicarbonate Precipitates

The step of recovering the carbonate/bicarbonate precipitates may be achieved by separating the calcium carbonate precipitates or the sodium carbonate/bicarbonate precipitates from said solution. Any suitable separating technique, as will be well known to those skilled in the art, may be employed including, but not limited to, gravity separation, filtration, centrifugation, and so forth.

The separated calcium carbonate recovered from said solution may be used in paper making, white paints, pharmaceuticals, used in manufacture of fillers in plastics, tyre making, building products, stock feed additives and in agriculture.

Sodium carbonate/bicarbonate recovered from the sodium nitrate solution has a multitude of uses including food preparation, bread making and industrial uses.

The separated resulting ammonium nitrate solution or ammonium sulphate solution may be subsequently used in the manufacture of nitrogen rich fertilisers, also used in the production of ammonium nitrate fertiliser. The ammonium sulphate solution is used as a liquid or crystallized sulphate rich fertiliser.

Apparatus for Removing Carbon Dioxide from Flue Gas

The apparatus for removing carbon dioxide from a flue gas comprises:
a vessel having an inlet to receive a solution containing calcium nitrate, sodium nitrate or calcium sulphate and an inlet to receive a gas mixture of flue gas and ammonia;
a gas-liquid contactor configured to diffuse said gas mixture into the calcium nitrate solution, the sodium nitrate solution or the calcium sulphate solution received in the vessel;
the vessel being provided with an impellor and draft tube configured to circulate the diffused gas mixture in the calcium nitrate, sodium nitrate or calcium sulphate solutions for a period of time sufficient to produce carbonate/bicarbonate precipitates.

The apparatus may further comprise a separator for separating the resulting carbonate/bicarbonate precipitates. The separator may be any separator suitable for separating calcium carbonate or sodium carbonate/bicarbonate precipitates from the ammonium nitrate solutions or ammonium sulphate solution, as will be understood by the person skilled in the art. Examples of suitable separators include, but are not limited to, cyclones, filters such as filter press arrangements, filter-cloth separators, gravity separators, centrifuge and so forth.

It will be appreciated that a flow path of the flue gas will be configured to convey the flue gas to the gas-liquid contactor. The flow path may be adapted to introduce a flow of ammonia gas into the flue gas and thereby convey a mixture of flue gas and ammonia to the gas-liquid contactor.

The apparatus may further comprise an ammonia recovery system in fluid communication with the reaction vessel and configured to receive and recover ammonia from off-gases in the headspace of the reaction vessel. The ammonia recovery system may be configured to recirculate the off-gases in the headspace of the reaction vessel and mix them with the flue gas.

Reaction Vessel

The reaction vessel may be any vessel suitably configured for contacting the flue gas-ammonia gas mixture with the calcium nitrate solution to produce calcium carbonate precipitates and ammonium nitrate in solution or the sodium nitrate solution to produce sodium carbonate/bicarbonate and ammonium nitrate n solution, or the calcium sulphate solution to produce calcium carbonate and ammonium sulphate in solution.

The reaction vessel has an inlet to receive said solutions or water and the respective calcium nitrate, sodium nitrate or calcium sulphate salts and an inlet to receive the flue gas-ammonia mixture. The reaction vessel will be provided with an outlet for withdrawing a mixture of carbonate/bicarbonate precipitates and the ammonium nitrate or ammonium sulphate solutions which can be subsequently separated in the separator.

The reaction vessel may be covered to prevent loss of emissions therefrom. In particular, ammonia gas entering the head space in the reaction vessel may be captured and recycled back to the flow path of the flue gas entering the reaction vessel.

It will be appreciated that the apparatus may comprise more than one reaction vessel arranged in series, each subsequent vessel being configured to receive overflow of reactants and products from an adjacent preceding reaction vessel in said series.

Alternatively, one or more reaction vessels may be operated as a continuous batching system.

Gas-Liquid Contactor

The gas-liquid contactor may be configured to diffuse said gas mixture into the calcium nitrate, sodium nitrate or calcium sulphate solutions. In one embodiment of the invention, the gas-liquid contactor takes the form of a hollow perforated annulus that is arranged in fluid communication with the flow path to convey the mixture of flue gas and ammonia thereto.

The perforations of the gas-liquid contactor may be configured and sized to produce a gas bubble having a mean size selected to ensure a desired degree of liquid-gas mass transfer to achieve absorption of reacted carbon dioxide and ammonia as $(NH_4)HCO_3$ in the calcium nitrate solution, sodium nitrate solution or the calcium sulphate solution and effective gas scrubbing.

The reaction vessel may be provided with an impellor configured to circulate the diffused gas mixture in the calcium nitrate, sodium nitrate or calcium sulphate solutions for a period of time sufficient to produce carbonate/bicarbonate precipitates.

The impellor establishes a circulatory flow of gas mixture in the calcium nitrate, sodium nitrate or calcium sulphate solutions to facilitate the physical absorption or chemisorption processes described above to produce calcium or sodium carbonate/bicarbonate precipitates and ammonium nitrate or ammonium sulphate solution.

Cooling Means

The apparatus may further comprise a cooling means located upstream of the reaction vessel for cooling the flue gas. The cooling means may take the form of a heat exchanger, radiator or an expander.

The heat exchanger may be any suitable heat exchanger, such as a shell and tube heat exchanger, plate heat exchanger, plate and shell heat exchanger, plate fin heat exchanger, and so forth. The heat exchanger may be air-cooled or water cooled manifolds. Alternatively, the heat exchanger may employ an alternative gas or liquid coolant, such as a refrigerant or cooling tower, which is circulated through a refrigeration circuit and the heat exchanger by one or more pumps.

The expander may be any suitable device configured to expand the flue gas, thereby lowering its pressure and temperature. Examples of suitable expanders include, but are not limited to manifolds, venturi tubes, turbo expanders, pressure reducing valves, and so forth.

The reaction vessel may also be provided with a cooling means for maintaining said solutions at a temperature less than 35° C. Suitable cooling means include a refrigerated jacket associated with said reaction vessel.

Referring to FIGS. 1 to 5, where like reference numerals are used to denote similar or like parts throughout, one embodiment of the method and apparatus 10 for removing carbon dioxide from flue gas will now be described.

Figure 1:
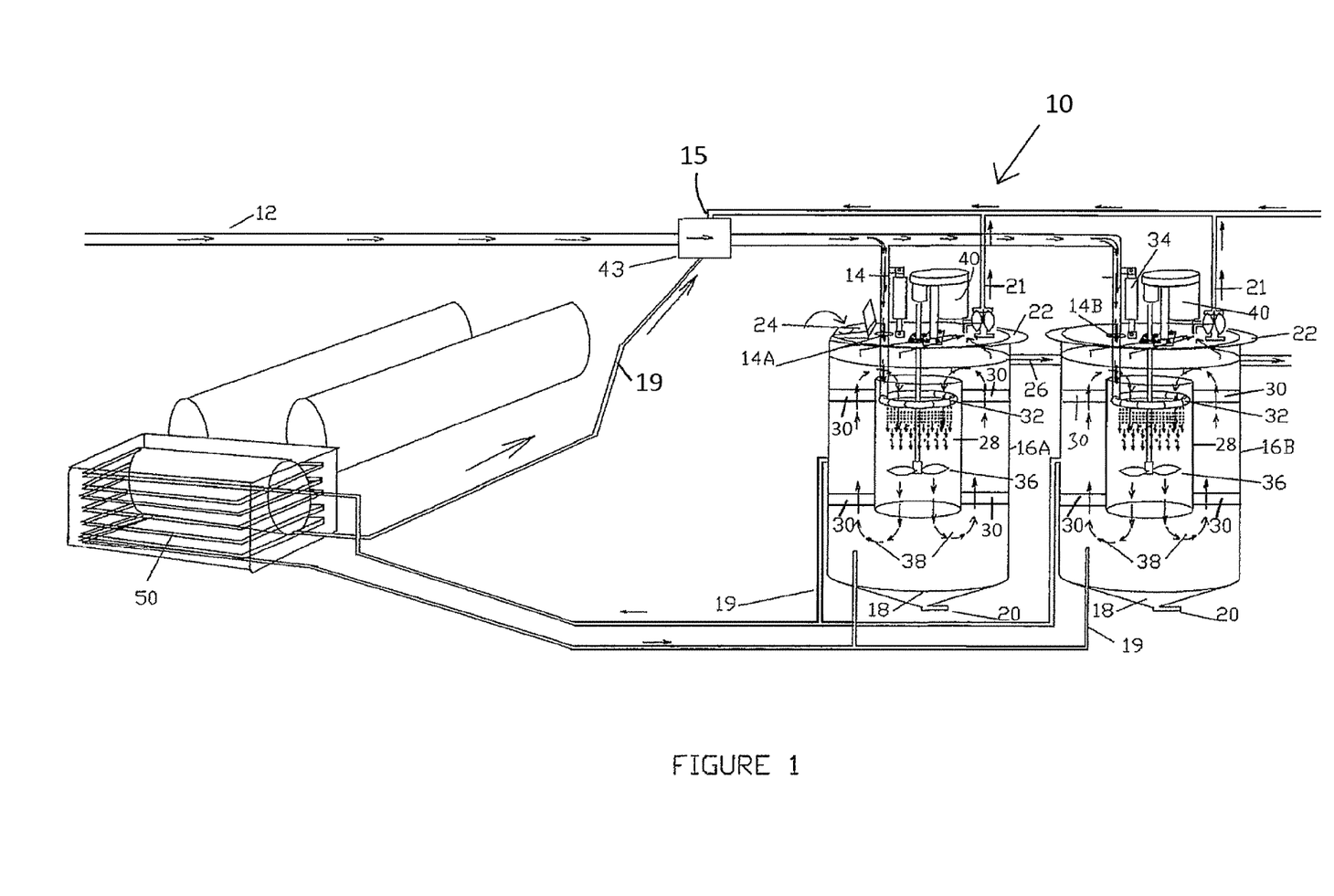
FIG. 1 is a schematic representation of an apparatus for removing carbon dioxide from flue gas; and, FIG. 2 is a schematic representation of a plant set up for removing carbon dioxide from flue gas using continuous batching operation system.

Flue gas is emitted from an emissions source (e.g. power station, not shown) via a flue 12. The flue delivery pipe 12 has an inline boost (super-charger Routes type not shown) positioned before the multiple tubed air cooled manifold 45 to give the desired emission delivery pressure to an annulus 32. The flue 12 may be configured in fluid communication directly through a venturi/annulus 43. where ammonia gas is introduced at input port 15.

The venturi/annulus 43 mixes ammonia gas with the flue gas. Additionally, humidified slipped ammonia vapours recirculated from respective headspaces of reaction vessels 16A, 16B may also be mixed with the flue gas in the venturi/annulus 43 through line 19. In this way, the reaction between ammonia and carbon dioxide may commence prior to the ammonia-flue gas mixture entering respective inlets 14 of the reaction vessels 16A, 16B arranged in series.

The venturi/annulus 43 may also be configured to receive ammonia gas after it has passed through an expanding ammonia chiller 50. This ammonia delivery line delivers gas to the venturi/annulus 43.

Cooling the gas mixture is important because the reaction between ammonia and carbon dioxide is exothermic.

The cooling supplied from the expanding ammonia gas may also be used as a heat exchange medium in the heat exchanger 50. The skilled person will understand that these and other measures may be employed to maintain the temperature of the ammonia-flue gas mixture to less than 35° C.

It will be appreciated that prior to mixing with ammonia, the flue gas may have been cooled to less than 35° C. by an inline multi-tubed air-cooled and multi-tubed water cooled heat exchangers manifolds 45. An emission conditioning venturi/annulus 43 blends the flue gas with the humidified returning gaseous vapour recovered from the reactors head space. Anhydrous ammonia gas may be introduced into the flue gas stream.

Furthermore, the reaction vessels 16A, 16B may also be kept at a desired temperature range, preferably less than 35° C., even more preferably less than 30° C. The reaction mixture in the reaction vessels 16A and 16B may also be cooled by pumping the reaction mixture through the heat exchanger 50 and returning it back to the reactor in a cooled state via circulation lines 19.

The reaction vessels 16A, 16B are generally vertical cylindrical vessels with a downwardly tapering lower portion 18 terminating in an outlet 20 in the form of a drain for withdrawing the liquid contents of the reaction vessels 16A, 16B. The reaction vessels 16A, 16B are provided with respective lids 22 to contain off-gases (e.g. ammonia) from the liquid contents of the reactions vessels 16A, 16B in the headspace thereof. Conduits 21 are provided to direct and recycle such off-gases back to the venturi/annulus 43 to report back into the flue gas stream 12. Withdrawal of off-gases may be achieved by means of applying negative pressure to the headspace of the reaction vessels 16A, 16B with a vacuum pump (shown FIG. 3) the off-gases are returned under pressure back into flue gas stream via the venturi/annulus 43 (shown FIG. 3 and FIG. 5)

Reaction vessel 16A is provided with a lidded hatch inlet 24 to receive water, calcium nitrate, sodium nitrate or calcium sulphate therein. Reaction vessel 16A may also be provided with an overflow pipe and stack 46 with final launder 47 (shown FIG. 3 and FIG. 5). These systems allow the ammonia-flue gas mixture to pass through the reaction vessels 16A, 16B and report to the atmosphere fully laundered via stack launder 47.

Reaction vessel 16A is provided with an overflow pipe 26 in fluid communication with reaction vessel 16B to convey excess solutions from reaction vessel 16A to adjacent reaction vessel 16A.

Each reaction vessel 16A, 16B is provided with a draft tube 28, in the form of a hollow cylinder, concentrically aligned along a central longitudinal axis of the reaction vessels 16A, 16B. The draft tube 28 is supported within the reaction vessel 16 by supporting brackets 30 laterally extending from side walls of the reaction vessel 16.

Figure 5:
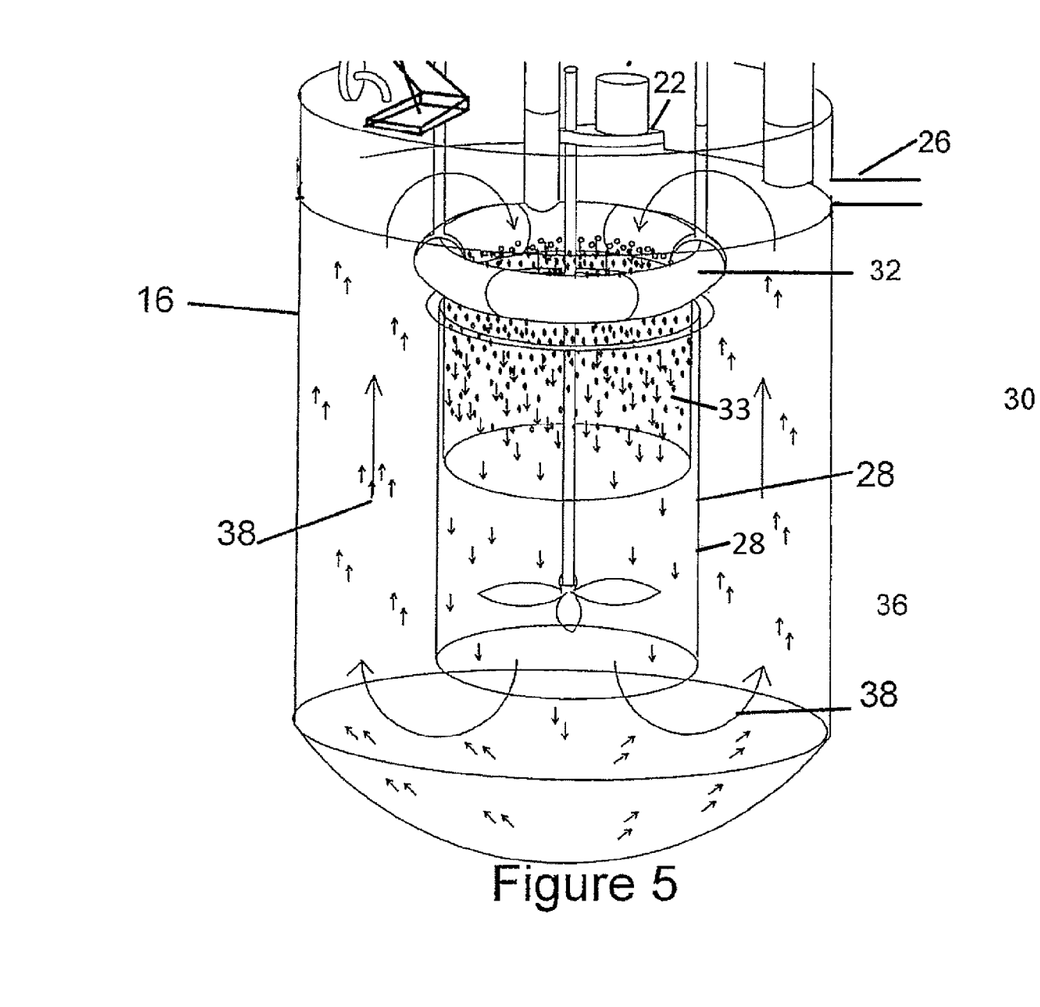
FIG. 5 is a schematic representation of the reactor annulus used in contacting the reacted gas-mix with the circulating solutions dispersing gas-ammonia with the solution facilitating adsorption of carbon dioxide and diffusing bubbles into the circulating solution.

The inlets 14 are integral with a gas-liquid contactor 32 which is disposed in an upper portion above the draft tube 28. In this particular embodiment, the gas-liquid contactor 32 comprises a hollow perforated annulus fitted with a sliding skirt with open bi-pass slots that fits inside the draft tube. The annulus may be raised to clear the circulating solution or be lowered down to submerge the annulus below the surface of the solution as needed. The gas-liquid contactor 32 is arranged, in use, to be submerged below the surface of the solution in the reaction vessel 16. A sliding skirt 33 slips within the draft tube 28 (FIG. 5). The gas-liquid contactor 32 may be provided with a hoist means 34 to raise or lower the gas-liquid contactor 32 clear of the solution within the reaction vessel 16.

The diameter of the hollow perforated annulus 32 is selected such that an outer diameter of the hollow perforated annulus 32 is spaced apart from side walls of the draft tube 28. Preferably, the perforations in the hollow annulus 32 are disposed on an underside thereof so that, in use, a flow of bubbles of flue gas-ammonia gas mixture descends through the draft tube 28 (FIG. 5).

The reaction vessel 16 is also provided with an impellor 36 mounted on a shaft disposed in longitudinal alignment with the central longitudinal axis of the reaction vessel 16. The impellor 36 is driven by a motor 40 and associated top drive mounted on the lid 22 of the reaction vessel 16. In use, the impellor 36 creates a down draft which draws the flow of gas bubbles downward through the draft tube 28 and along a circulatory path 38 to disperse the gas bubbles through the calcium nitrate, sodium nitrate or calcium sulphate solutions held in the reaction vessel 16.

Figure 2:
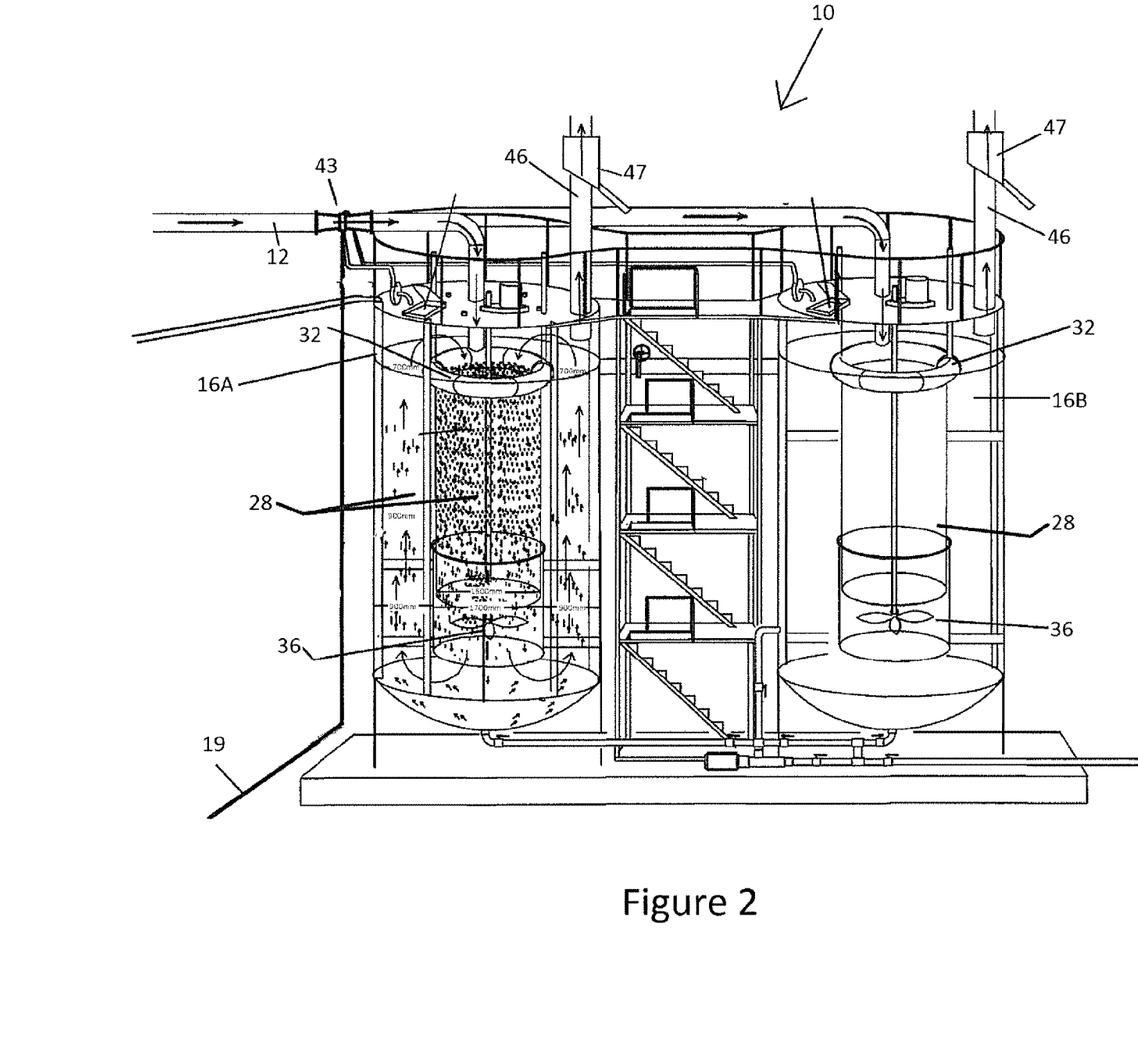
Figure 3:
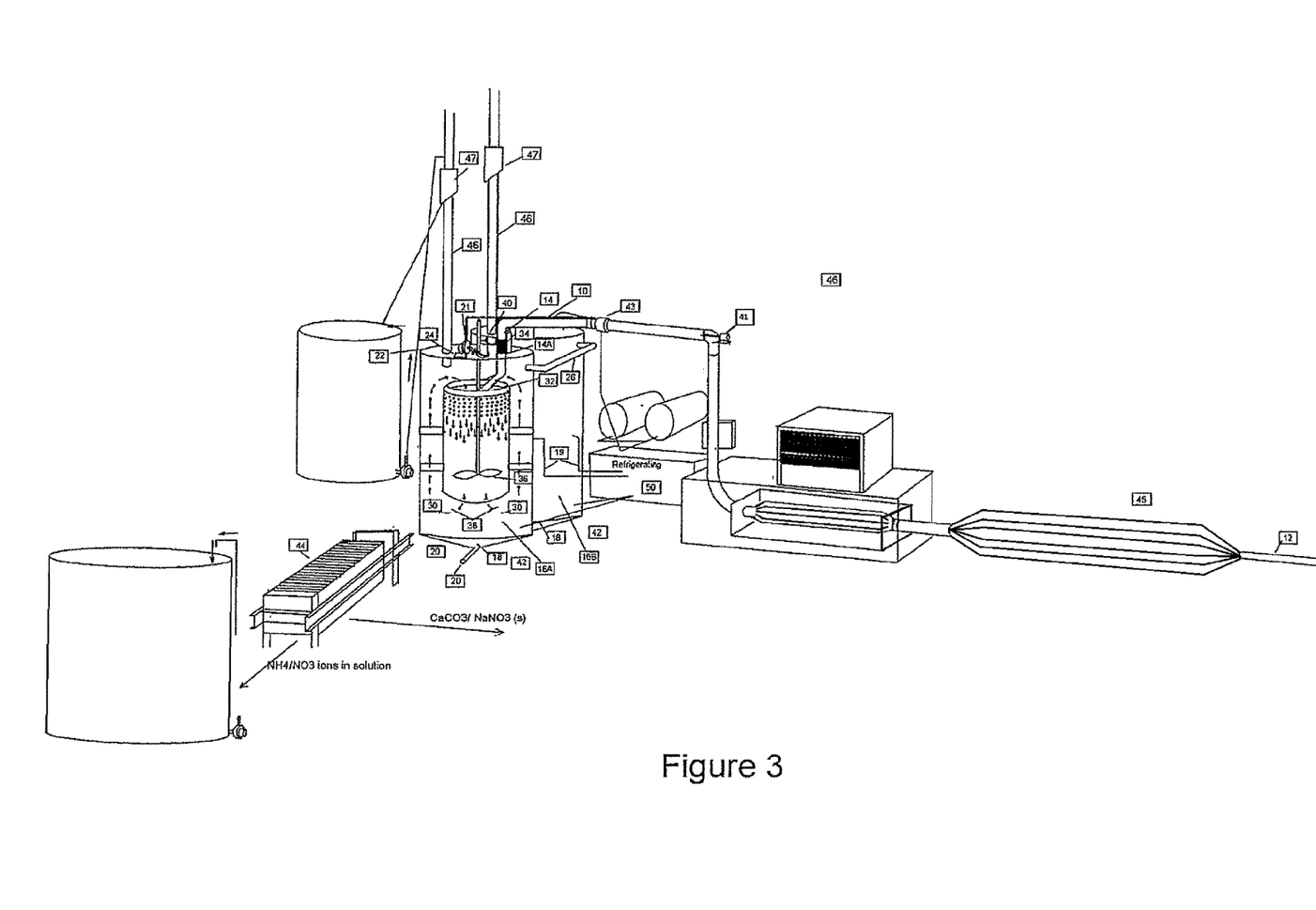
Figure 4:
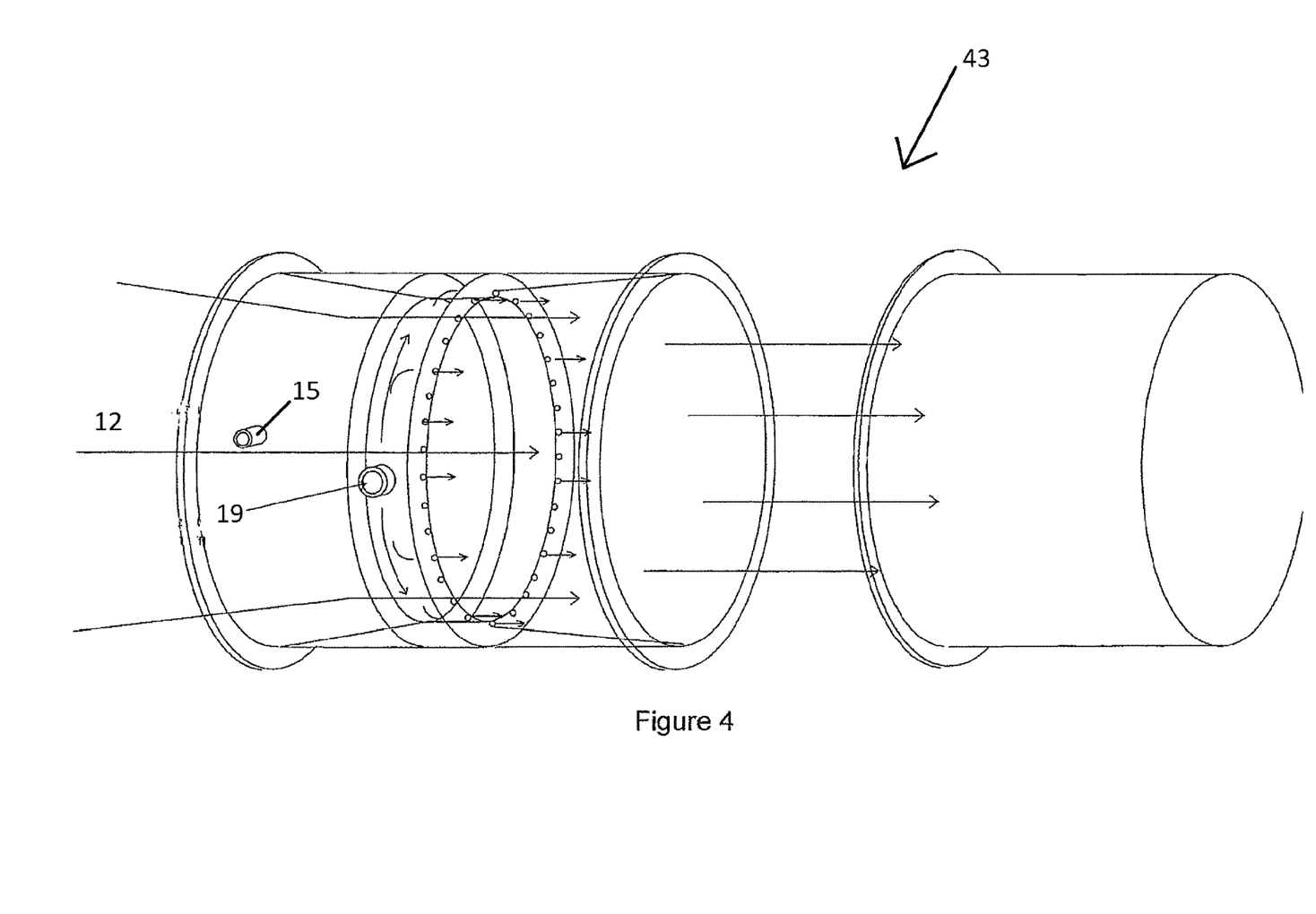
FIG. 4 is an exploded schematic representation of the venturi/annulus device used in reintroducing slipped ammonia and $CO_2$ recovered from the reactors head space back into the ammoniated flow of flue gas prior to being contacted with solution.

FIG. 2 shows one embodiment of the apparatus and demonstrates the sequential gas flow from reaction vessel 16A to reaction vessel 16B and on through a series of precipitation tanks 42. Cumulative residence time gained from flowing the solutions through the series of precipitation tanks 42, gives the resulting solutions time to age and complete the reaction.

The precipitation tanks 42 are provided with lids, respective draft tubes 28 and impellors 36 to agitate the contents therein. The precipitation tanks 42 may be arranged in fluid communication with a separator 44 in the form of a filtration press or vacuum belt filter to separate carbonate/bicarbonate precipitates from the ammonium nitrate solution or ammonium sulphate solutions.

In use, flue gas from an emissions source is cooled to less than 35° C., mixed with ammonia gas and the ammonia-flue gas mixture is then directed via a flue 12 to an inlet 14 of a reaction vessel 16. Said gas mixture is injected through gas-liquid contactor into the calcium nitrate solution, sodium nitrate solution or calcium sulphate solution held in the reaction vessel 16. The gas-liquid contactor is configured to diffuse bubbles of said gas mixture in the calcium nitrate, sodium nitrate or calcium sulphate solutions. A rotating impellor 36 generates a circulatory flow path for the bubbles within the reaction vessel 16 to enhance gas-liquid mass transfer and associated chemisorption and physical absorption processes associated with the conversion of $CO_2$ into carbonate/bicarbonate precipitate.

When the solution in reaction vessel 16 reaches its absorptive capacity with respect to carbon dioxide, it may be directed to precipitation tanks 42 and subsequently the separator 44 for recovery of carbonate/bicarbonate precipitates. The resulting filtrate containing ammonium nitrate or ammonium sulphate, may then be used for the manufacture of nitrogen rich fertilizers, ammonium sulphate rich fertilizers, fertilizer blends or used to manufacture ammonium nitrate fertilizer. Any gaseous vapors ($CO_2/NH_3$) that may slip from the circulating solution are recycled back into the emission stream via the venturi/annulus 43 to report back through the system.

As will be evident from the foregoing description, the process of the present invention facilitates a reduction of greenhouse gas emissions (i.e. carbon dioxide) in comparison with conventional technologies for treating flue gas.

A financial instrument tradable under a greenhouse gas Emissions Trading Scheme (ETS) may be created by juxtaposing an apparatus as described herein and a flue gas emissions source, such as an industrial power plant, in a manner whereby the processes of the present invention may be readily employed. The instrument may be, for example, one of either a carbon credit, carbon offset or renewable energy certificate. Generally, such instruments are tradable on a market that is arranged to discourage greenhouse gas emission through a cap and trade approach, in which total emissions are 'capped', permits are allocated up to the cap, and trading is allowed to let the market find the cheapest way to meet any necessary emission reductions. The Kyoto Protocol and the European Union ETS are both based on this approach.

One example of how credits may be generated by using the fertilizer plant as follows. A person in an industrialized country wishes to get credits from a Clean Development Mechanism (CDM) project, under the European ETS. The person contributes to the establishment of a fertilizer plant employing the processes of the present invention in proximal vicinity to a source of flue gas emissions. Credits (or Certified Emission Reduction Units where each unit is equivalent to the reduction of one metric tonne of $CO_2$ or its equivalent) may then be issued to the person. The number of CERs issued is based on the monitored difference between the baseline and the actual emissions. It is expected by the applicant that offsets or credits of a similar nature to CERs will be soon available to persons investing in low carbon emission energy generation in industrialized nations, and these could be similarly generated.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of removing carbon dioxide from a flue gas, the method comprising:
   a) mixing the flue gas with ammonia; and,
   b) diffusing the gas mixture from step a) into a solution containing calcium nitrate, sodium nitrate or calcium sulphate to produce carbonate and/or bicarbonate precipitates in an ammonium nitrate or ammonium sulphate solution through a gas-liquid contactor, the gas-liquid contactor being disposed in a vessel having a draft tube and an impellor concentrically disposed within the draft tube,
   wherein the gas-liquid contactor is disposed in an upper portion above the draft tube, the gas-liquid contactor comprising a perforated annulus provided with a sliding skirt that fits within the draft tube, the arrangement being such that an outer diameter of the perforated annulus is spaced apart from side walls of the draft tube and the impellor generates a circulatory flow path for bubbles of the gas mixture in said solution for a period of time sufficient to produce carbonate and/or bicarbonate precipitates.

2. The method according to claim 1 further comprising the step of recovering the carbonate/bicarbonate precipitates.

3. The method according to claim 1, wherein that the calcium nitrate solution or the sodium nitrate solution have a dissolved salts concentration of at least 230 grams per litre.

4. The method according to claim 1, wherein the calcium sulphate solution has a dissolved salts concentration of at least 500 grams per litre.

5. The method according to claim 1, wherein the pH of the calcium nitrate solution, sodium nitrate solution or calcium sulphate solution is in the range of about 7 to about 10.

6. The method according to claim 5, wherein the pH of the calcium nitrate, sodium nitrate or calcium sulphate solution is in the range of 7.5 to 9.6.

7. The method according to claim 1, wherein the temperature of the calcium nitrate solution, sodium nitrate solution or calcium sulphate solution is less than about 35° C.

8. The method according to claim 7, wherein the temperature of the calcium nitrate solution, sodium nitrate solution or calcium sulphate solution is from about 20° C. to about 35° C.

9. The method according to claim 1, wherein ammonia comprises from about 20% v/v to about 40% v/v of the flue gas-ammonia mixture.

10. The method according to claim 1, wherein the flue gas is compressed to a pressure in a range of between about 5 psi to about 15 psi.

11. An apparatus for removing carbon dioxide from a flue gas, the apparatus comprising:
   a vessel having an inlet to receive a solution containing calcium nitrate, sodium nitrate or calcium sulphate and an inlet to receive a mixture of flue gas and ammonia; and
   a gas-liquid contactor configured to diffuse said gas mixture into the calcium nitrate solution, the sodium nitrate solution or the calcium sulphate solution received in the vessel,
   the vessel being further provided with a draft tube and an impellor concentrically disposed within the draft tube,
   wherein the gas-liquid contactor is disposed in an upper portion above the draft tube, the gas-liquid contactor comprising a perforated annulus provided with a sliding skirt that fits within the draft tube, the arrangement being such that an outer diameter of the perforated annulus is spaced apart from side walls of the draft tube and the impellor generates a circulatory flow path for bubbles of the gas mixture disposed about side walls of the draft tube.

12. The apparatus according to claim 11, wherein the apparatus further comprises a separator for separating the calcium carbonate precipitates or sodium carbonate/bicarbonates precipitates.

13. The apparatus according to claim 11 further comprising a cooling means configured to cool the flue gas to less than 35° C.

14. The apparatus according to claim 13, wherein the cooling means comprises a heat exchanger disposed upstream of the gas mixture inlet of the reaction vessel.

15. The apparatus according to claim 11, further comprising an ammonia recovery system in fluid communication with the reaction vessel and configured to receive and recover ammonia from off-gases in the headspace of the reaction vessel.

16. A method of creating a financial instrument tradable under a greenhouse gas Emissions Trading Scheme (ETS), the method comprising the step of exploiting a method for removing carbon dioxide from flue gas defined by claim 1.

17. The method according to claim 16, wherein the financial instrument comprises one of either a carbon credit, carbon offset or renewable energy certificate.

* * * * *